United States Patent [19]

Schulte et al.

[11] 4,238,557

[45] Dec. 9, 1980

[54] LEAD ACID BATTERY PLATE WITH STARCH COATED GLASS FIBERS

[75] Inventors: Heinrich Schulte; Werner Kirchhoff, both of Hagen, Fed. Rep. of Germany

[73] Assignee: Varta Batterie, A.G., Hanover

[21] Appl. No.: 898,488

[22] Filed: Apr. 20, 1978

[30] Foreign Application Priority Data

Jun. 2, 1977 [DE] Fed. Rep. of Germany ....... 2724839

[51] Int. Cl.³ ...................... H01M 4/20; H01M 4/62
[52] U.S. Cl. .................................. 429/212; 429/215
[58] Field of Search ..................... 429/212, 215, 217

[56] References Cited

U.S. PATENT DOCUMENTS

| 668,356 | 2/1901 | Placet | 429/217 |
| 1,023,861 | 4/1912 | Marino | 429/217 |
| 1,051,261 | 1/1913 | Ricks | 429/217 |

OTHER PUBLICATIONS

Ritchie, Addition Agents for Negative Plates of Lead-Acid Storage Batteries, The Electrochemical Society Preprint 92–34, pp. 415–420, published Oct. 1947.

*Primary Examiner*—Donald L. Walton
*Attorney, Agent, or Firm*—Weiser, Stapler & Spivak

[57] ABSTRACT

The active mass of a lead storage battery plate containing an additive of glass fibers which were provided with a coating before being introduced into the mass.

13 Claims, No Drawings

LEAD ACID BATTERY PLATE WITH STARCH COATED GLASS FIBERS

The invention relates to an electrode plate for lead storage batteries which is provided with a pasted-on active mass containing an additive of glass fibers.

Conventionally, plate grids are coated or filled with mass whose ingredients are lead powder or red lead, sulfuric acid and water. In such mass, even after air drying, shrinkage makes itself deleteriously felt, in such manner that the mass surface develops tears and cracks.

After initial forming, full capacity has not yet been reached and the reduced performance in relation to current yield has to be overcome by means of several electrical treatments, i.e. through application of appreciable time and expense, prior to delivery of the lead plates or cells. For the plates themselves, the drastic electrochemical treatment which must be repeatedly performed creates the risk that the mass will prematurely start to crumble from out of the pockets of the lead grid.

Many attempts have already been made to achieve better cohesion of the mass, as for example by working glass fibers into the lead oxide paste. In accordance with U.S. Pat. No. 2,107,937, glass fibers of five to six micron thickness and of a length roughly corresponding to the grid spacing are worked into the mass paste, and are stirred, with addition of supplemental sulfuric acid, for such a period that the relatively long fibers are subdivided into lengths which are shorter and commensurate with a spreadable paste. It is also known that the fibrous material can enhance the porosity of the plate in addition to the intended effect upon cohesion.

The known glass fiber additives have, however, generally not yielded the desired result, particularly because during mixing and pasting, the glass fibers employed frequently broke into pieces which were too short and thereby lost their cohesion capability. Moreover, homogenous distribution of the fibers was generally not achieved.

Accordingly, it is an object of the invention to provide an active mass for grid plates which is characterized after pasting and in its dry state by freedom from tearing and good cohesion as well as high initial capacity.

It is another object that the glass fiber according to the invention can be homogenously mixed together with the active mass without special difficulties and without being damaged by the mixing action.

These and other objects which will appear are achieved in accordance with the invention by providing the glass fibers with a starch coating.

The quantity of glass fibers which is added lies between about 0.1 and 0.7% by weight, preferably between 0.25 and 0.5% by weight, relative to the weight of the lead powder, or oxide which is utilized. The length of the glass fiber lies between about 5 and 20 mm, preferably between 8 and 15 mm, and the thickness of the individual fiber should be between about 5 and 20 microns, preferably between 8 and 15 microns. The glass fibers are impregnated with about 1 to 5%, and preferably with 2 to 3% by weight of starch.

A positive mass according to the invention may, for example, be composed of the constituents Lead powder (e.g. Barton process powder) about 75%,
Red lead about 8%,
Glass fibers (impregnated with starch) about 0.4%,
Sulfuric acid of 1.08 g/cm$^3$ density about 16.6%
and is produced in accordance with the following recipe:

By forming a slurry of starch (amylum solubile) with little water and stirring it into water at 95° to 100° C., a starch paste is prepared, which contains about 10 grams of pure starch per liter of water. With this starch paste the glass fibers are treated through immersion, allowing them to drip off, and subsequent drying. The fraction by weight of starch relative to the dry glass amounts to about 2.5%.

The above-mentioned Barton process, which is also known as oxide pan process, involves placing fluid lead in a pan, stirring it vigorously while passing an air flow through the pan, and removing the desired product through a suitable outlet arrangement. The process yields lead oxide particles and particles of metallic lead having a more or less spherical shape.

For the glass fiber there can be used not only a staple glass fiber of about 10 to 15 mm staple length, but also spun glass yarn or cut textile glass. In any case the glass is acid resistant, the fiber thickness about 9 microns.

The staple glass fiber and the textile glass are only starched and dryed. On the other hand the spun glass yarn is starched in about finger-thick bundles, dried, and thereafter cut into lengths of 10 to 15 mm.

Lead powder and red lead are mixed with the sulfuric acid for about 5 minutes. Then, the treated glass fibers are added without interrupting the mixing process. After a further mixing period of 15 minutes the mass is ready for use.

In the active mass according to the invention the length of the glass fibers is predetermined before their admixture, and remains constant. While introducing the glass fibers into the premixed wet mass, the starch provides a slippery medium which promotes uniform distribution within the mass and reduces the required mixing time. The starch additive, which is small in terms of weight, exerts a favorable influence upon the subsequent utilization of the mass. In its role as reinforcing fiber and porosity enhancer, the glass fiber treated according to the invention improves the initial capacity and the lifetime characteristics of the plate.

It has been found that it is possible to construct cells using the mass in accordance with the invention, whose characteristics are comparable to cells with tube electrodes, but which can be produced much more economically.

We claim:

1. An electrode plate for lead storage batteries having a pasted-on active mass containing an additive of glass fibers, wherein the glass fibers have been provided with a starch coating before being added to the active mass.

2. The electrode plate of claim 1, wherein the glass fibers are coated with about 1 to 5% by weight of starch.

3. The electrode plate of claim 2, wherein the glass fibers are coated with 2 to 3% by weight of starch.

4. The plate of claim 1, characterized in that the glass fiber content amounts to about 0.1 to 0.7% by weight of the lead utilized.

5. The plate of claim 4, characterized in that the glass fiber content amounts to 0.25 to 1.5% by weight, relative to the weight of the lead utilized.

6. The plate according to claim 1, wherein the glass fibers have a length of about 5 to 20 mm and a thickness of about 5 to 20 microns.

7. The plate according to claim 6, wherein the glass fibers have a length of 8 to 15 mm, and a thickness of 8 to 15 microns.

8. The plate of claim 1, wherein the glass fibers are selected from the group of staple glass fiber, spun glass yarn, and cut textile glass.

9. The cell of claim 1, wherein the glass fibers are of spun glass yarn, and wherein the starch has been coated upon them while they were in about finger-thick bundles, which were subsequently cut to length.

10. The plate of claim 1 wherein the starch coating has been provided by forming a slurry of starch with water, stirring the slurry into water at 95° to 100° C., preparing from this a starch paste, and immersing the glass fibers in this starch paste, allowing them to drip off and drying them.

11. The plate of claim 10 wherein the fraction by weight of the starch coating relative to the dry glass amounts to about 2.5%.

12. The plate of claim 11 wherein the glass fibers coated with starch are substantially uniformly distributed throughout the active mass.

13. The plate of claim 12 wherein the glass fibers coated with starch are mixed with the remainder of the active mass, the length of the glass fibers remaining substantially the same as before their admixture.

* * * * *